United States Patent [19]

Ikeda et al.

[11] 3,779,918
[45] Dec. 18, 1973

[54] LUBRICANT-CONTAINING POLYMERIC SYNTHETIC RESIN COMPOSITION

[75] Inventors: Hiroshi Ikeda; Takao Kawakita, both of Osaka, Japan

[73] Assignee: Sumitomo Electric Industries, Ltd., Higashi-ku, Osaka, Japan

[22] Filed: May 5, 1969

[21] Appl. No.: 821,626

[30] Foreign Application Priority Data
May 4, 1968 Japan.............................. 43-29634
Sept. 9, 1968 Japan.............................. 43-64345

[52] U.S. Cl.................. 252/12.6, 252/12, 252/12.4
[51] Int. Cl. ........................ C10m 7/30, C10m 7/26
[58] Field of Search.................. 252/12, 12.2, 12.4, 252/12.6

[56] References Cited
UNITED STATES PATENTS

| | | | |
|---|---|---|---|
| 3,541,011 | 11/1970 | Davis et al. | 252/12.6 |
| 2,975,128 | 3/1961 | Stott | 252/25 |
| 3,406,854 | 10/1968 | Testa | 252/25 |
| 3,454,495 | 7/1969 | Schneider | 252/25 |
| 3,480,547 | 11/1969 | Van Dyk | 252/25 |
| 3,516,933 | 6/1970 | Andrews | 252/25 |
| 2,246,092 | 6/1941 | Gilman | 252/12.2 |
| 3,114,708 | 12/1963 | Morway et al. | 252/12 |
| 3,218,255 | 11/1965 | Pratt | 252/12 |
| 3,224,967 | 12/1965 | Battista | 252/12.2 |
| 3,287,288 | 11/1966 | Reiling | 252/12 |
| 3,325,405 | 6/1967 | Kamath | 252/12 |
| 3,431,203 | 3/1969 | Hartmann et al. | 252/12.2 |
| 3,455,864 | 7/1969 | Dodson | 252/12.2 |
| 3,467,596 | 9/1969 | Hermann | 252/12 |

Primary Examiner—Daniel E. Wyman
Assistant Examiner—I. Vaughn
Attorney—Sughrue, Rothwell, Mion, Zinn and Macpeak

[57] ABSTRACT

An oil-containing or lubricant-containing molded plastic composition comprising a lubricant adsorbent carrier having a surface area of at least 0.01 m²/g, and being selected from the group consisting of a nonfusible naturally occurring inorganic powder, a synthetic high molecular weight material, a naturally occurring high molecular weight material, and mixtures thereof in admixture with a lubricant, said carrier being blended with a base plastic material selected from the group consisting of a synthetic resin and a mixture of at least two synthetic resins is disclosed.

14 Claims, 3 Drawing Figures

LUBRICANT-CONTAINING POLYMERIC SYNTHETIC RESIN COMPOSITION

BACKGROUND OF THE INVENTION

1. Field of the Invention

The present invention relates to an oil-containing plastic composition.

2. Description of the Prior Art

As an abrasion resistant or lubricious plastic material used at the present time, polyamide, polyacetal, polyethylene, and polyphenol resins have been known in the lower load field; however, these resins cannot be used in the higher load field.

On the other hand, only polytetrafluoroethylene can be used in the higher load field. However, the range in which this polytetrafluoroethylene can be employed is extremely limited because of its being expensive.

Heretofore, attempts have been made to improve the abrasion resistance of synthetic resins commonly used, such as the above-described polyamide, by, for example, increasing the degree of crystallization by heat treatment (in the case of polyamide), or by increasing the density by the selection of the polymerization conditions and the catalyst (in the case of polyethylene), or by giving a porous structure of the above-described plastic material which cannot be utilized as an oil-containing bearing alloy so that a lubricant is maintained better, or, in addition, by blending molybdenum disulfide or graphite in the plastic material.

However, in former oil-containing porous structure material, even though its lubrication was considerably improved, any well known means such as extruding and injection molding could not be applied thereto. Another disadvantage was in its mechanical strength, i.e., not being able to bear high loads. Further, production was limited by the use of additive materials.

The present inventors have repeatedly investigated the problem in expectation of results that show that the plastic material will be given a preferable lubricating effect by uniformly mixing a lubricating oil or lubricant therein.

However, according to experiments performed by the present inventors, the above synthetic resins, polyamides and polyacetals, if mixed with an oil and molded, tend to separate the oil because of the lack of affinity to the oil; the polyethylene tends to decrease its mechanical strength by adding a small amount of oil while having a certain degree of mutual miscibility with the hydrocarbon oil, and the phenol resins canot be sufficiently cured in case of molding.

SUMMARY OF THE INVENTION

Figure 1A:
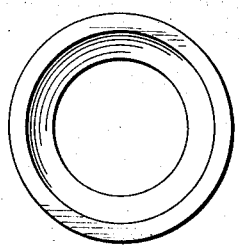
FIG. 1 shows a ball joint receiving seat in a plane view ($a$) and in a side elevation partially in section ($b$).

As a result of repeated research attempting to overcome the above-noted difficulties, and while studying the addition of lubricating oil to the resins with the aid of super-high molecular weight polyethylene, the present inventors have found that polyethylene having a molecular weight of about 50,000 and as low a melt index as possible (for example, Hostahlen GUR from Hechist Co. and Heisex milion from Sumitomo Chemical Co.) can be employed for this purpose.

As a result of further research with respect to other materials bearing in mind that a plastic composition havin a high lubrication and abrasion resistance will be obtained by blending a lubricating oil adsorbed on a powdery or porous inorganic or organic substances as a carrier into the plastic material and molding it, the present inventors have found that lubrious plastic material can also be obtained by using other materials having specific properties as a carrier instead of the super-high molecular weight polyethylene and blending it into the base plastic material in the preparation of a lubricious plastic composition.

DESCRIPTION OF THE PREFERRED EMBODIMENTS

The carrier which is used in the present invention may be an organic or inorganic substance having a large surface area (at least 0.01 m$^2$/g) and an ability to sufficiently contain a lubricating oil, and which is a non-fusible natural fiber or natural inorganic powder or porous material, or a synthetic or natural high molecular weight substance which may be employed even if it is not fusible or flowable at the molding temperature of the basic plastic material to be molded. This carrier may be used in an appropriate combination with the base plastic material.

The combination of base plastic material and synthetic high molecular weight carriers are as shown in Tables 1 and 2. Table 1 shows a combination wherein the fusing temperature of the carrier is higher jthan the molding temperature of the basic plastic material, and Table 2 shows some examples of combinations wherein the fusing flowability of the carrier is, by far, lower than that of the basic plastic material.

In the Tables, B designates the basic plastic material and C designates the carrier.

TABLE 1

| Combination No. | | Material | M.P. (°C) | Molding Temperature (°C) | Surface area |
|---|---|---|---|---|---|
| 1 | B | Nylon 6 | 215 | 235 | |
|   | C | Polytetrafluoroethylene | 327 | | 9.219 |
| 2 | B | Nylon 6 | 215 | 230 | |
|   | C | Phenol resin | 240 | | 0.031 |
| 3 | B | Acetal resin | 175 | 210 | |
|   | C | Nylon 66 | 240 | | 2.384 |
| 4 | B | Acetal resin | 175 | 210 | |
|   | C | Polycarbonate | 240 | | 9.903 |
| 5 | B | Polyethylene | 120 | 150 | |
|   | C | Nylon 6 | 215 | | 0.313 |
| 6 | B | Epoxy resin | | 100 | |
|   | C | Polyethylene | 120 | | 2.336 |

Examples of a carrier having a surface area of above 0.01 m$^2$/g are cotton (10.105 m$^2$/g), mouslin (7.851 m$^2$/g), baked clay (7.186 m$^2$/g), etc. and these may be combined with the base of polyethylene, Nylon 6, etc.

TABLE 2

| Combination No. | | Material | M.P. (°C) | Molding Temp. (°C) | Flowability (poise Kg/cm$^2$) | Surface Area |
|---|---|---|---|---|---|---|
| 1 | B | Nylon 6 | 225 | 240 | 8×10$^2$,40 | |
|   | C | Low pressure Polyethylene | 137 | | 2×10$^2$,40 | 0.981 |
| 2 | B | Nylon 6 | 225 | 240 | 5×10$^2$,20 | |

| | | | | | |
|---|---|---|---|---|---|
| 3 | C | Nylon 66 | 267 | 3×10²,20 | |
| | B | Acetal resin | 175 220 | 4×10³,4 | |
| 4 | C | Low pressure Polyethylene | 130 | 5×10⁵,40 | 0.381 |
| | B | Acetal resin | 175 220 | 2×10³,40 | |
| 5 | C | High pressure Polyethylene | 120 | 12×10⁵,40 | 0.915 |
| | B | Epoxy resin | 137 150 (hardened) | 10, | |
| 6 | C | Low pressure polyethylene | 137 | 2×10⁶, | 0.981 |
| | B | High pressure polyethylene | 120 173 | 3×10³,40 | |
| 7 | C | Acetyl cellulose | 160 | 9×10⁴, | 1.218 |
| | B | Polyvinyl chloride | 120 184 | 5×10⁴,40 | |
| 8 | C | Low pressure polyethylene | 130 | 5×10⁵,40 | 0.381 |
| | B | High pressure polyethylene | 120 190 | 3×10³,40 | |
| | C | Low pressure polyethylene | 137 | 5×10⁵,40 | 3.238 |

As is obvious from Tables 1 and 2, the carriers which can be used in the present invention have, desirably, a surface area of above 0.01 m²/g and the melt viscosity of the carrier plastic material is desirably above three times that of the basic plastic material; with the result that if these requirements are sufficiently satisfied, the molecular weight of the polyethylene need not be so high, although as the molecular weight is increased, good lubrication and good abrasion resistance can be obtained.

In Table 2 the average molecular weights of the low and high pressure polyethylene used in Nos. 1, 3, 4, 5, 7 and 8 are 140,000; 70,000; 40,000; 140,000; 70,000; and 1,000,000 respectively.

In general, materials which are very low in fusing flowability such as, for example, polyethylene, phenol resins, nylon, polyesters, polytetrafluoroethylene, and natural fibers such as cotton, asbestos, and the like, and inorganic materials such as metallic fibers, glass fibers, carbon black, kaolin, baked clay, activated carbon, etc., can be used as a carrier for most of the basic plastic materials in the practice of the present invention. In this case, the base and carrier may be the same kind of material, and the carrier may be of the thermosetting type.

In the present invention, in order to increase the melt viscosity of the carrier to be used thereby increasing its viscosity with respect to the viscosity of the lubricating oil, the carrier is physically and chemically cross-linked to produce a three dimensional structure. In order to improve the retention of the lubricating oil, and in order to improve the adaptability of the basic plastic material, the carrier is baked to a porous state and sufficiently dried so that the lubricating oil is easily adsorbed.

The carrier to be used may be cured or grafted to be modified, and in addition two or more kinds of carriers may optionally be blended.

Any well known synthetic lubricating oil may be employed in the present invention, such as a petroleum lubricating oil containing oxygen, sulfur and nitrogen, diester oil, silicone oil, alkylene glycol oil, olefin oil, halogenated hydrocarbon oil, etc., containing machine oil, spindle oil and high molecular weight hydrocarbons as a main component, although a lubricating oil having as high a heat resistance as possible is desired. Further, high melting waxes such as paraffin, olefin, etc., and low molecular weight polyethylene and polypropylene, etc., may be used.

The synthetic resins which can be used as a base in the present invention include thermoplastic synthetic resins having high heat resistance, such as polyamide, polyacetal, polycarbonate, polyethylene, polyethylene terephthalate, polypropylene, acrylonitrile, butadiene, styrene resins, and thermosetting synthetic resins such as phenol resins, epoxy resin, polyester resins, urea resins, diacryl phthalate resins, etc.

The above-described thermoplastic or thermosetting resins are used in order to improve the electrical and mechanical strengths of the basic plastic materials. These resins have been previously added with fillers such as metallic powders such as iron, copper, aluminum, etc., or metallic alloys, glass powders, metallic oxide powders, inorganic fibers (glass fibers), natural or artificial fibers, etc. Known solid lubricants may be added such as molybdenum disulfide, graphite, boron nitride, calcium fluoride, etc., for increasing the lubrication.

The form of the base plastic materials and carriers to be blended in the present invention is not critical since they may be powdery, granular, gaseous or liquid and further, may be monomers. the fillers may be added before blending with the carrier and before molding.

The present invention may be carried out as follows.

1. A lubricating oil is blended into a super-high molecular weight polyethylene. The water adsorbed on the surface of the polyethylene may preferably be sufficiently removed and the polyethylene dried before using it. The dried polyethylene is mixed with the oil or impregnated with the oil under atmospheric or reduced pressure after sintering polyethylene in a nitrogen atmosphere at 190°C for 15 minutes to make it porous, if necessary, impregnated with the oil after crushing.

2. The oil-containing super-high molecular weight polyethylene, obtained as described above is added and mixed to a thermoplastic syntehtic resin such as the above-described polyamide, polyacetal, and polyethylene, etc., and extruded, injected or compressed and sintered, or wherein a thermosetting synthetic resin is used, such as an epoxy resin, a polyester resin, or a phenol resin, etc., the polyethylene may be subjected to curing and molding steps and also metal powders, glass fibers, solid lubricants, etc., can optionally be added.

The present invention, as described above, however, has the advantage of adopting the following modifications:

1. Not only one kind of lubricating oil but also various fillers can be added by using a carrier. For example, there are anti-oxidizing agents, foaming agents, electrical insulating oils, etc., and surface treating agents or solid lubricants such as silane, boran, etc., which can be added to increase the adhesiveness of fillers such as metallic powders, inorganic fibers, etc. A hardening agent for Epikote 828, a peroxide catalyst such as benzoyl peroxide for a polyester, and a monomer for improving the properties of acrylonitrile for the polyethylene can also be added.

2. Depending on the characteristics of the intended lubrious plastic material, one or more kinds of plastic material and carrier plastic can be selectively adopted.

The present invention has been accomplished wherein the abrasion resistance of the base plastic materials such as polyamides, polyacetals, polycarbonates, etc., can be highly improved by using a lubricating oil mixed with one or more specific higher fatty acids as described below, their esters, amids, chlorides, metallic soaps or other oil-improvers, or mixtures thereof with mineral oils, or synthetic lubricaing oils wherein the abrasion resistance and lubrication of the above resins is improved by incorporating lubricating oil therein, thereby utilizing the mutual miscibility of polyethylene and hydro-carbon oil.

The higher fatty acids and their derivatives which may be used in the practice of the present invention are as follows:

1. Saturated fatty acid: Capric acid, undecanic acid, lauric acid, myristic acid, palmitic acid, stearic acid, alagic acid, beheic acid, lignoceric acid, cerotic acid, montaic acid, merysic acid, etc.
2. Unsaturated fatty acid: Lindelic acid, tudic acid, physetreic acid, myristreic acid, somalic acid, petroceric acid, oleic acid, eraisic acid, cadreic acid, condic acid, whale oil acid, ersic acid, blasysic acid, ceracoreic acid, tallilic acid, xymenic acid, linolic acid, linveraisic acid, etc.
3. Oxy acid: Linolinic acid, etc.
4. Other (Ketoic acid etc.) Licaic acid, etc.
5. Fatty acid ester: An ester of methyl, ethyl, propyl, butyl, amyl, hexyl, heptyl, octyl, decyl, cocyl, contyl, or oleyl alcohol, etc. and a saturated fatty acid such as acetic acid, caproic acid, enatoic acid, caprylic acid, peralgonic acid, undecanic acid, lauric acid, myristic acid, palmitic acid, stearic acid, lignoiceric acid, cerotic acid, montaic acid, merysic acid, etc., or an unsaturated acid such as petroceric acid, oleic acid, eraisic acid, linolic acid, linoleic acid, araxydic acid, prasidic acid, ercaic acid, lisinolic acid, etc. And also, a dibasic fatty acid ester, a glycidyl ester, etc.
6. Fatty acid amide: Octylamide, decylamide, laurylamide, mystylamide, palmityl amide, stearylamide, eicosylamide, docosylamide, etc.
7. The chlorinated compounds of 1 to 6. Chlorinated stearic acid, chlorinated -O-tolyl-stearic acid amide, methyl dichlorinated stearate, etc.
8. Metallic soap: A soap of stearic acid, oleic acid, palmitic acid, lauratic acid, etc., and a metal such as Li, Be, Mg, Ca, Sr, Cu, Zn, Cd, Sb, Ce, Ti, Zr, Pb, Cr, Mn, Co, Ni, Fe, Hg, Ag, Tl, Sn, etc.
9. Other oil improver: Amine soap, sulfur recovery of terepin oil, nitrogen-containing fatty acid soap such as fatty acid amide, diphenylamine, nitrile, etc.

In the present invention a lubricious plastic composition is prepared by incorporating one or more of the above-listed mateials or mixtures thereof with a mineral oil or a synthetic lubricating oil in a carrier having a surface area of above 0.01 $m^2/g$, blending with the base plastic material and molding the bend.

When the above-described oil is blended in the base plastics materials since the oil is lower in viscosity than the base plastic material at the molding temperature of the base plastic mateial, it separates from the phase, and therefore, the oil is difficult to blend at a concentration above 1 percent. The present invention utilizes a carrier for overcoming such a disadvantage.

The carrier which can be used in the present invention must have a melting point higher than the molding temperature of the base plastic material or have a higher viscosity than the melt viscosity of the base plastic material at the molding temperature, be capable of being uniformly dispersed in the base plastic material while containing the above-described oil, to thereby easily blend the above described oil into the base plastic material.

The present invention will be more fully illustrated by the following examples, which are intended to be non-limiting in nature.

EXAMPLE 1

20 percent, by volume, of mineral oil No. 200 was blended into Hostalen GUR a polyethylene manufactured by Hoechst Co., and 10 percent, by volume, of the mixture and 3 percent of graphite were blended into a Duracon a polyacetal manufactured by Polyplastics and injection molded at 190°C.

EXAMPLE 2

The oil-containing Hostalen GUR described in Example 1 was sintered at 190°C in a nitrogen atmosphere for 20 minutes and was blended into a Duracon as in Example 1, and injection molded.

EXAMPLE 3

Hostalen GUR was baked at 190°C in a nitrogen atmosphere for 10 minutes, impregnated with 30 percent, by volume, of mineral oil No. 200 under a reduced pressure of below 0.5 mm Hg for 30 minutes, ground to below 30 mesh, blended with 25 percent, by weight, of nylon 6 and further blended with 30 percent of Fe powder of MH 100 made by Henegas Co., and 3 percent of graphite, and then was injection molded.

EXAMPLE 4

The baking in Example 3 was conducted at 240°C in a nitrogen atmosphere for 30 minutes and molded at 1,500 $Kg/cm^2$.

EXAMPLE 5

The oil-containing HGUR made in Example 3 was blended in 40 percent, by weight, of Epikote 828-HPA, an epoxy resin (60 : 40) and cured at 125°C for 4 hours.

EXAMPLE 6

An experiment was conducted in the same manner as in Example 5 except that 30 percent of iron powder and 5 percent of graphite were blended therein.

The results of having tested the compositions of the present invention on abrasion resistance were as follows:

| Material | Abrasion Width (mm) | |
|---|---|---|
| | 198 Kg × 36 m/sec | 198 Kg × 0.054 m/sec |
| Hostalen GUR | Baked | Baked |
| 20% Oil-containing Hostalen GUR | Baked | 4.0 |
| Nylon 6 | Baked | 3.0 |
| Nylon 6–20% GUR (oil 20%) | 6.5 | 2.1 |
| Nylon 6–20% GUR–30% Fe powder | 5.0 | 2.8 |
| Nylon 6–20% GUR–30% Fe powder Nylon 6–20% GUR–3% graphite | 4.0 | 2.5 |

This experiment was conducted employing a 200 m running test without using other lubricants. In the Table, GUR is Hostalen GUR, and oil is mineral oil No. 200.

As is obvious from the Table, the plastic material, when blended with the filler such as metallic powders, etc., has an abrasion resistance at a high load and high speed, and at a low speed no filler is desired. This is considered to be caused by the fact that the abrasion heat at a high speed is radiated in the presence of metallic powder and, simultaneously, the shearing tensile strength is increased by its filling-up, and, therefore, the heat resistance is more improved.

EXAMPLE 7

20 parts of terpene oil No. 200 (manufactured by Maruzen Petroleum Co.) was blended in polytetrafluoroethylene M-12 (manufactured by Daikin Industry Co.) and 30 parts of the blend was blended into Nylon 6 (manufactured by Nihon Rayon Co.) and molded at 240°C to make a film of 0.5 mm in thickness.

Thereafter, the film was immersed into a solution mixture of 2.4 - 2.6 - toluylene - diisocyanate (80 : 20) to cross-link the Nylon at 100°C × 3 mmHg.

EXAMPLE 8

Example 7 was repeated using Sumikon PM 20 (a phenolic resin manufactured by Sumitomo Bakelite Co.) as a carrier and CM 1001 (a polyamide manufactured by Toyo Rayon Co.) as a plastic material to make a film.

Cross-linking treatment was not carried out.

EXAMPLE 9

Example 7 was repeated using Nylon 66 powder (manufactured by Toyo Rayon Co. —surface area 2.384 m$^2$/g) as a carrier, mobil DTE oil HH (a mineral oil manufactured by Mobil Petroleum Co.) as a lubricating oil, and Duracon M 90 (an acetal resin manufactured by Polyplastics Co.) as a plastic material and at a molding temperature of 220°C.

EXAMPLE 10

Example 8 was repeated using cotton having a surface area of 10.105 m$^2$/g as a carrier and Hizex No. 1000 (an acetal resin manufactured by Mitsui Petroleum Chemical Co.) as a plastic material and at a molding temperature of 170°C.

EXAMPLE 11

10 parts of Mobil DPE oil HH ( a mineral oil manufactured by Mobil Petroleum Co.) and 1 part of Silane A-1100 (γ-amino-propyltrietoxyoxysilane manufactured by Union Carbide) were mixed and adsorbed on 100 parts of Kaolin (surface area 7.851 m$^2$/g), sufficiently dried, and were blended in Hizex No. 1000 (a polyethylene manufactured by Mitsui Petroleum Chemical Co.) and molded at 170°C, and then electron-radiated at 30 mobile to cross-link the polyethylene.

EXAMPLE 12

50 percent of Mobil DTE oil HH (manufactured by Mobil Petroleum Co.) and 3 percent of CPB graphite (a fine graphite powder) were blended in low pressure polyethylene Hizex No. 6100 P (a polyethylene manufactured by Mitsui Petroleum Co.) and then blended in Nylon 6 CM 1001 G (a condensation polymerization produce of aminocaprolactam manufactured by Toyo Rayon Co.) containing glass fibers and injection molded at 270°C.

EXAMPLE 13

100 parts of Hizex No. 7000P, a polyethylene manufactured by Mitsui Petroleum Co., and 20 parts of crystal wax fused at 120°C (manufactured by Mobile Petroleum Co.) were mixed and further blended into Sumikasen F 70 (a polyethylene manufactured by Sumitomo Chemical Co.) to 15 percent by volume and injection molded at 190°C.

EXAMPLE 14

200 parts of Nylon 66 powder (manufactured by Toyo Rayon Co.) were sufficiently dried and 50 parts of terpene oil No. 2000 (manufactured by Maruzen Petroleum Co.) and 0.05 parts of γ-phenol naphthylamine were blended to 100 parts of the dried Nylon 66 powder. Further, 10 parts of silicon oil were blended to the remaining 100 parts of the Nylon 66 carrier.

These two kinds of carriers were sufficiently mixed and blended to a plastic material and injection molded at 240°C.

EXAMPLE 15

Hizex No. 1000 powder (a polyethylene manufactured by Mitsui Petroleum Chemical Co.) was electron-radiated to 20 Mrad. to make a carrier and was molded in the same manner as in Example 8 using Mobil DTE oil HH (a mineral oil mnaufactured by Mobil Petroleum Co.) as a lubricating oil and Duracon M 90 (a polyacetal manufactured by Polyplastics Co.) as a plastic material.

EXAMPLE 16

15 parts of terpene oil No. 200 (manufactured by Maruzen Petroleum Co.) were blended to 50 parts of Nylon 66 powder (manufactured by Toyo Rayon Co.).

On the other hand, 80 parts of anhydrous hymic acid were blended to 50 parts of the same carrier.

The bath was mixed well and blended to 100 parts of Epikote 815, an epoxy resin and 0.5 parts of DMP-30, a tridimethylaminomethylphenol manufactured by the Rohm & Haas Co. and cured at 120°C for 5 hours.

The test results of the compositions of the present invention with respect to abrasion resistance was as follows:

| Material | Abrasion Width (mm) | | Tensile Strength Kg/cm$^2$ |
|---|---|---|---|
| | 6.6 kg. | 19.8 kg | |
| Nylon 6 | Baked | Baked | 700 |
| Delrin (manufactured by Du Pont) | Baked | Baked | 650 |
| N 6 containing glass fibers | Baked | Baked | 1700 |
| T containing MoS$_2$ | 3.2 | 5.5 | 150 |
| Carbon graphite | 2.3 | 2.5 | |
| N 6 – 10% H7000 (containing 15 parts of oil) | 2.0 | 4.8 | 640 |
| N 6 – 10% HM (containing 30 parts of oil) | 2.0 | 5.5 | 550 |
| N 6 – 7% HM (containing 10 parts of oil) | | | |
| N 6 – 30% glass fibers | 1.5 | 3.3 | 1300 |
| Du – 10% T (containing 15 parts of oil) | 4.3 | 6.0 | 510 |
| Du – 10% N (containing 10 parts of oil) | 4.0 | 6.0 | 490 |
| Du – 10% H7000 P (containing 15 parts of oil) | 2.2 | Baked | 510 |

The above experiments were conducted employing 200 m running test at 3.5 m/sec. without using other lubricants. In the Table, "containing oil" indicates the use of terpene oil No. 200 as a lubricating oil, and N 6 represents Nylon 6, 66 represents Nylon 66, D represents Delrin (a polyacetal manufactured by Du Pont), T represents Teflon, H 7000 P represents Hizex 7000 P, a polyethylene, HM represets Hizex Milion, a polyethylene and Du represents Duracon a polyacetal.

While the present invention may be carried out as described in the above specific examples, in general, the present invention may be performed as follows: that is, in the practice of the present invention, the base plastic carrier, lubricating oil, etc., were mixed according to the following operations:

a. Preferably, the carrier and lubricating oil are previously dehydrated and dried before the lubriating oil is added to the carrier. If two or more kinds of carriers or lubricating oils are used, they may be previously mixed, or one of these may first be mixed to the other and may be operated to obtain the final mixture. In either case, the operation should be carried out to readily obtain a uniform mixture.

Also, the lubricating oil may be added and mixed under a reduced or superatmospheric pressure to be well adsorbed and the carrier may be baked, to be modified, before or after adding the lubricating oil. Further, the carrier and lubricating oil may be treated chemically or physically such as by electron radiation, to increase or decrease the viscosity of the lubricating oil (to cross-link the lubricating oil to a high density polyethylene carrier).

b. The mixture of the carrier and the lubricating oil, as obtained in (a), is then uniformly blended to a base plastic material. However, when using a thermosetting plastic material as the base, various reactions, such as prereaction polymerization and condensation etc. may be carried out after the mixing operation, or, if necessary, the operations of modifying, cross-linking, grafting and radiating the carrier may be conducted and further, glass fiber, metal powder, inorganic powder, silane, boron, etc. may be added.

c. The base plastic materisl is then molded under the molding condition. In this case, if necessary, the high molecular modification reaction or cross-linking of the carrier, or base, or lubricating oil are the same as in b, (electron radiation of polyethylene base, treatment of polyamide base in diisocyanate atmosphere, etc.).

EXAMPLE 17

90 percent by volume of Duracon M90 – 02 (a polyacetal manufactured by Polyplastics Co.) was well mixed in a mixture of 70 parts of CM 3001 (a polyamide manufactured by Toyo Rayon Co. —surface area 3.05 m$^2$/g) and 30 parts of stearic acid, the mixture being prepared by fusing at 100°C, then milling and pelletizing by means of a screw type extruder.

EXAMPLE 18

50 parts, by volume, of carbon black (surface area about 200 m$^2$/g), 20 parts, by volume, of palmitic acid, and 30 parts, by volume, of terpene oil No. 200 were mixed at 150°C, and 90 percent by volume of Duracon M 90–02 (a polyacetal manufactured by Polyplastics Co.) was mixed thereto and milled and pelletized by means of an extruder.

EXAMPLE 19

Oleic acid was used instead of the stearic acid in Example 17.

EXAMPLE 20

As in Example 19, a mixture of terpene oil No. 200 and stearic acid in the same volume was used.

EXAMPLE 21

As in Example 17, 20 parts, by volume, of methyl dichloride stearate was further added.

EXAMPLE 22

As in example 18, zinc stearate was substituted for the stearic acid.

EXAMPLE 23

As in Example 18, Hizex Milion (a polyethylene manufactured by Mitsui Petroleum Chemical Co.) was substituted for the carbon black and stearic acid was substituted for the palmitic acid.

EXAMPLE 24

As in Example 18, CM 1001 G (a Nylon 6 manufactured by Toyo Rayon Co., containing glass fiber) was substituted for the Duracon.

EXAMPLE 25

10 parts of merysic acid, 10 parts of stearic acid and 20 parts of RO–2500 oil (a mineral oil manufactured by Maruzen Petroleum Co.) were mixed in 60 parts of Polyfuron M 12 (a polytetrafluoroethylene surface area 8.08 m$^2$/g, manufactured by Daikin Co.) and 80 percent of Iubilon S–3000 (a polycarbonate manufactured by Mitsubishi Edogawa Chemical Co.) was added and mixed thereto and extruded and pelletized.

EXAMPLE 26

As in Example 23, Hizex 1300 a polyethylene was substituted for the Duracon.

The effect of the present invention may be readily appreciated by referring to the Table given below, whose samples were prepared according to the method of Example 23.

| Sample No. | Hizex Milion (part) | Stearic Acid (part) | Terpene No. 200 (part) | Duracon (%) |
|---|---|---|---|---|
| 1 | 50 | 20 | 30 | 80 |
| 2 | 50 | 50 | 0 | 80 |
| 3 | 50 | 0 | 30 | 80 |
| 4 | 50 | 25 | 50 | 80 |

Figure 2:
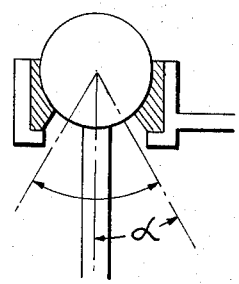
FIG. 2 shows a ball joint abrasion testing machine.

The above four samples and Duracon a polyacetal —5 percent graphite, Duracon and nylon-MoS$_2$ were tested as shown in FIG. 2, their abrasion resistance being determined under the following conditions:

1.
Load — 600 kg
Rubbing Velocity — 50/min.
Angle α — ± 30°
Number — 5 × 10$^5$

2.
Load — 600 kg
Rubbing Velocity — 150 /min.
Angle α — ± 30°
Number — 150 × 10$^4$ The test results were as follows:

| Sample No. | Abrased Amount (mg) | Temperature Elevation (°C) |
|---|---|---|
| 1 | *50 | 30 |
| 2 | *35 | 25 |
| 3 | *218 | 25 |
| 4 | *109 | 20 |
| Duracon-5% graphite | Baked (rubbing velocity below 3000) | — |
| Duracon | " | — |
| Nylon-MoS$_2$ | " | — |

\* Denotes "containing exuded oil".

Figure 1B:

FIG. 1 shows that the lubrious plastic composition of the present invention is very excellent in abrasion resistance.

What is claimed is:

1. A lubricant-containing heat-molded composition comprising a polymeric synthetic resinous base material blended with a lubricant adsorbent carrier, said carrier having a lubricant adsorbed thereon, and molded, said carrier having a melting point or a melt viscosity higher than said base material, having a surface area of at least 0.01 m²/g, and being selected from the group consisting of
   1. a non-fusible inorganic material;
   2. a synthetic high molecular weight polymeric resinous material;
   3. a naturally occurring high molecular weight polymeric material; and
   4. mixtures thereof; and said base material being selected from the group consisting of a polymeric synthetic resin and a mixture of at least two polymeric synthetic resins.

2. The lubricant-containing molded composition of claim 1, wherein said carrier is a non-fusible inorganic powder selected from the group consisting of carbon black, activated carbon, kaolin and baked clay.

3. The lubricant-containing molded composition of claim 1, wherein said carrier is a synthetic high molecular weight polymeric resinous material selected from the group consisting of a thermoplastic resin selected from the group consisting of polyethylene, polypropylene, polyamide, polyacetal, polytetrafluoroethylene, polycarbonate, and polyvinylchloride, and a thermoset resin selected from the group consisting of a phenolic resin, and an epoxy resin, said thermoplastic resin being non-fusible and having a high melting viscosity at the molding temperature of said base material.

4. The lubricant-containing molded composition of claim 1, wherein said carrier is a naturally occurring high molecular weight polymeric material and is cotton.

5. The lubricant-containing molded composition of claim 1, wherein said lubricant is selected from the group consisting of a mineral oil, a synthetic lubricant, and a member selected from the group consisting of saturated and unsaturated higher fatty acids, hydroxy derivatives threof, salt and esters thereof, and acid amides thereof.

6. The lubricant-containing molded composition of claim 1, wherein said polymeric synthetic resin base material is selected from the group consisting of a thermoplastic resin selected fromthd group consisting of polyethylene, polypropylene, polyamide, polyacetal, polytetrafluoroethylene, polycarbonate, and polyvinylchloride, and a thermoset resin selected from the group consisting of a phenolic resin, and an epoxy resin.

7. The lubricant-containing molded composition of claim 1, wherein a filler is additionally present.

8. The lubricant-containing molded composition of claim 1, wherein a solid lubricant is additionally present.

9. The lubricant-containing molded composition of claim 1, wherein said carrier is a super-high molecular weight polyethylene having an average molecular weight of above 50,000.

10. The lubricant-containing molded composition of claim 1, wherein said carrier is a super-high molecular weight polyethylene having an average molecular weight of above 50,000 and wherein said base material contains additionally a member selected from the group consisting of a fibrous material, a solid filler and a solid lubricant.

11. The lubricant-containing molded composition as set forth in claim 9, wherein said super-high molecular weight polyethylene has a melting point higher than that of said base material.

12. The lubricant-containing molded composition as set forth in claim 9, wherein said polyethylene is non-fusible.

13. The lubricant-containing molded composition as set forth in claim 1, wherein at least two lubricants are used with said carrier.

14. The lubricant-containing molded composition as set forth in claim 9, wherein said super-high molecular weight polyethylene has a melt viscosity higher than that of said base material.

\* \* \* \* \*